(12) United States Patent
Kim et al.

(10) Patent No.: US 8,098,371 B2
(45) Date of Patent: Jan. 17, 2012

(54) APPARATUS FOR MEASURING RESIDUAL STRESS OF OPTICAL FIBER

(75) Inventors: Dug Young Kim, Gwangju (KR); In Hee Shin, Gwangju (KR); Dong Ju Lee, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 337 days.

(21) Appl. No.: 12/350,786

(22) Filed: Jan. 8, 2009

(65) Prior Publication Data
US 2009/0180103 A1    Jul. 16, 2009

(30) Foreign Application Priority Data

Jan. 14, 2008  (KR) .................. 10-2008-0003916

(51) Int. Cl.
*G01N 21/00* (2006.01)

(52) U.S. Cl. .................................................. 356/73.1

(58) Field of Classification Search .................. 356/73.1
See application file for complete search history.

(56) References Cited

U.S. PATENT DOCUMENTS

| | | | |
|---|---|---|---|
| 7,317,517 B2 * | 1/2008 | Junnarkar et al. | 356/73.1 |
| 7,375,889 B1 * | 5/2008 | Kelly et al. | 359/501 |
| 2001/0022873 A1 | 9/2001 | Kim et al. | |

OTHER PUBLICATIONS

Product description, features, and specifications of Variable Phase Retarder by ARCoptix, Switzerland, www.arcoptix.com.

* cited by examiner

*Primary Examiner* — Tarifur Chowdhury
*Assistant Examiner* — Abdullahi Nur

(57) ABSTRACT

The present invention relates to an apparatus for measuring a residual stress of an optical fiber. More particularly, the present invention relates to an apparatus for measuring residual stress of an optical fiber which is provided with a variable polarizer of which rotation is unnecessary instead of a rotary analyzer to measure the residual stress in high resolution and at high speed.

There is provided an apparatus for measuring a residual stress of an optical fiber including a light generation unit that generates light; a lens unit that converts the generated light into collimated light; a polarization unit including variable polarization devices that divide the collimated light into two perpendicularly polarized light beams and control phase retardation of the polarized light beams by means of an electrical signal; a measurement unit that allows the divided light beams of two polarization states to penetrate an optical fiber to be measured; and a light detection unit that detects the polarization states of the light beams penetrating the optical fiber.

4 Claims, 4 Drawing Sheets

[FIG. 1]
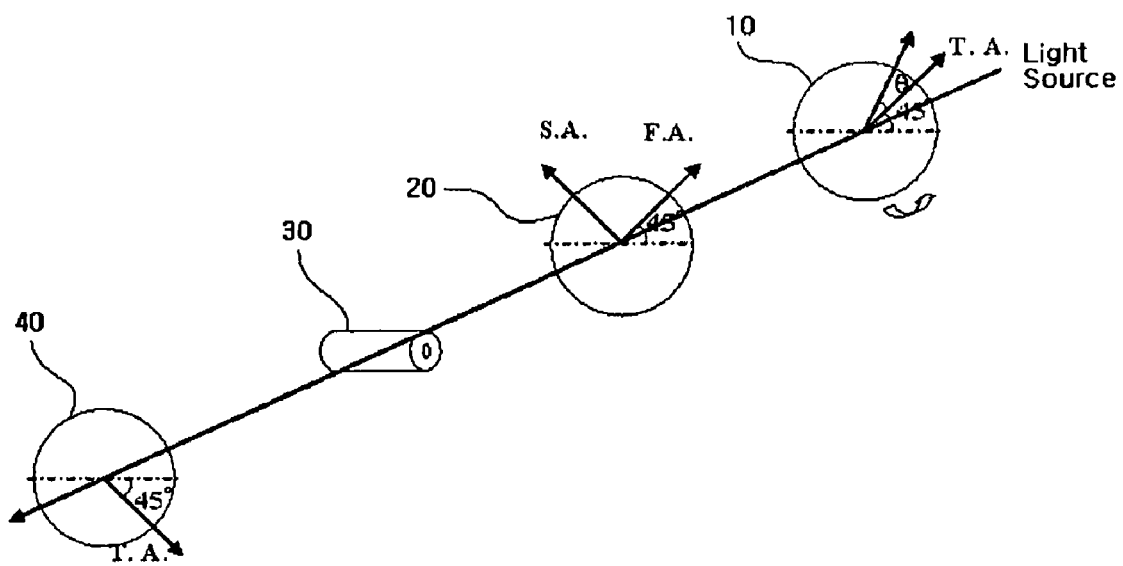

[FIG. 2]
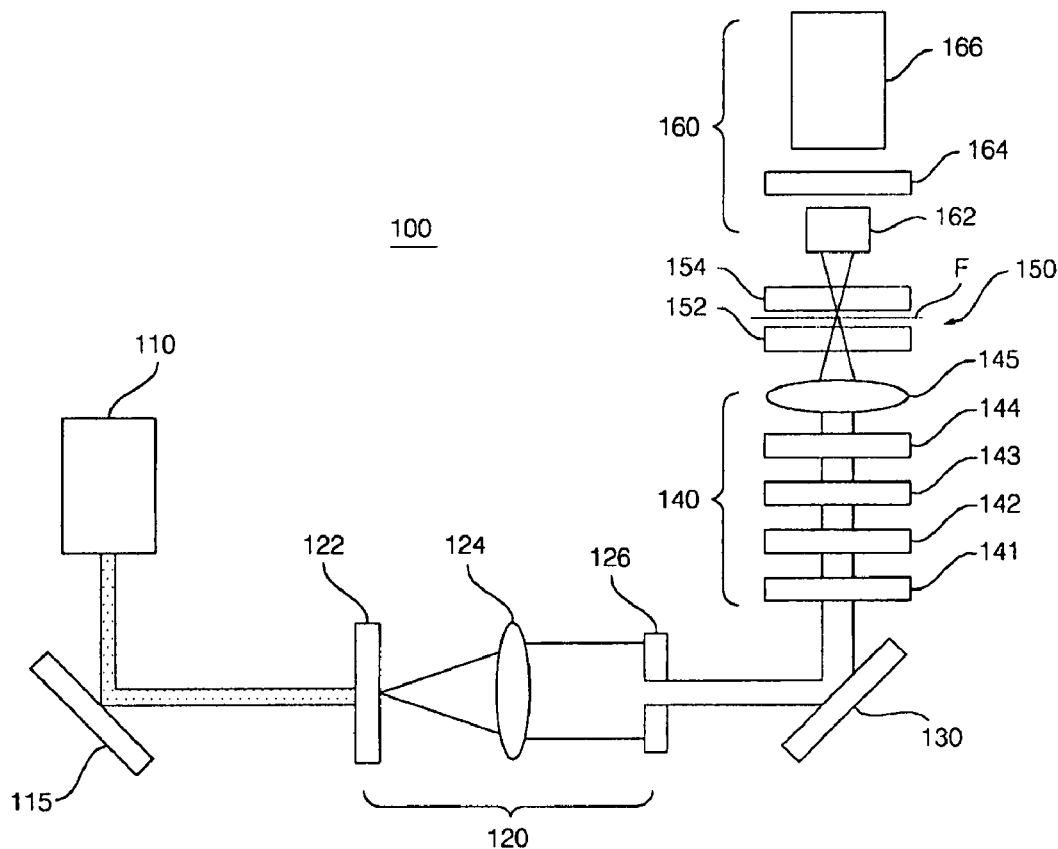
[FIG. 3]
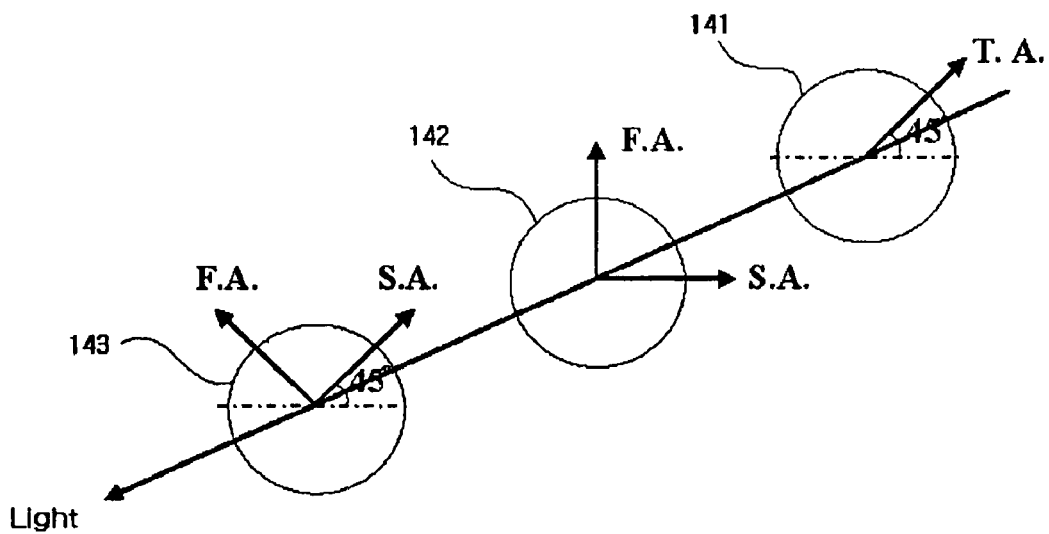

[FIG. 4]
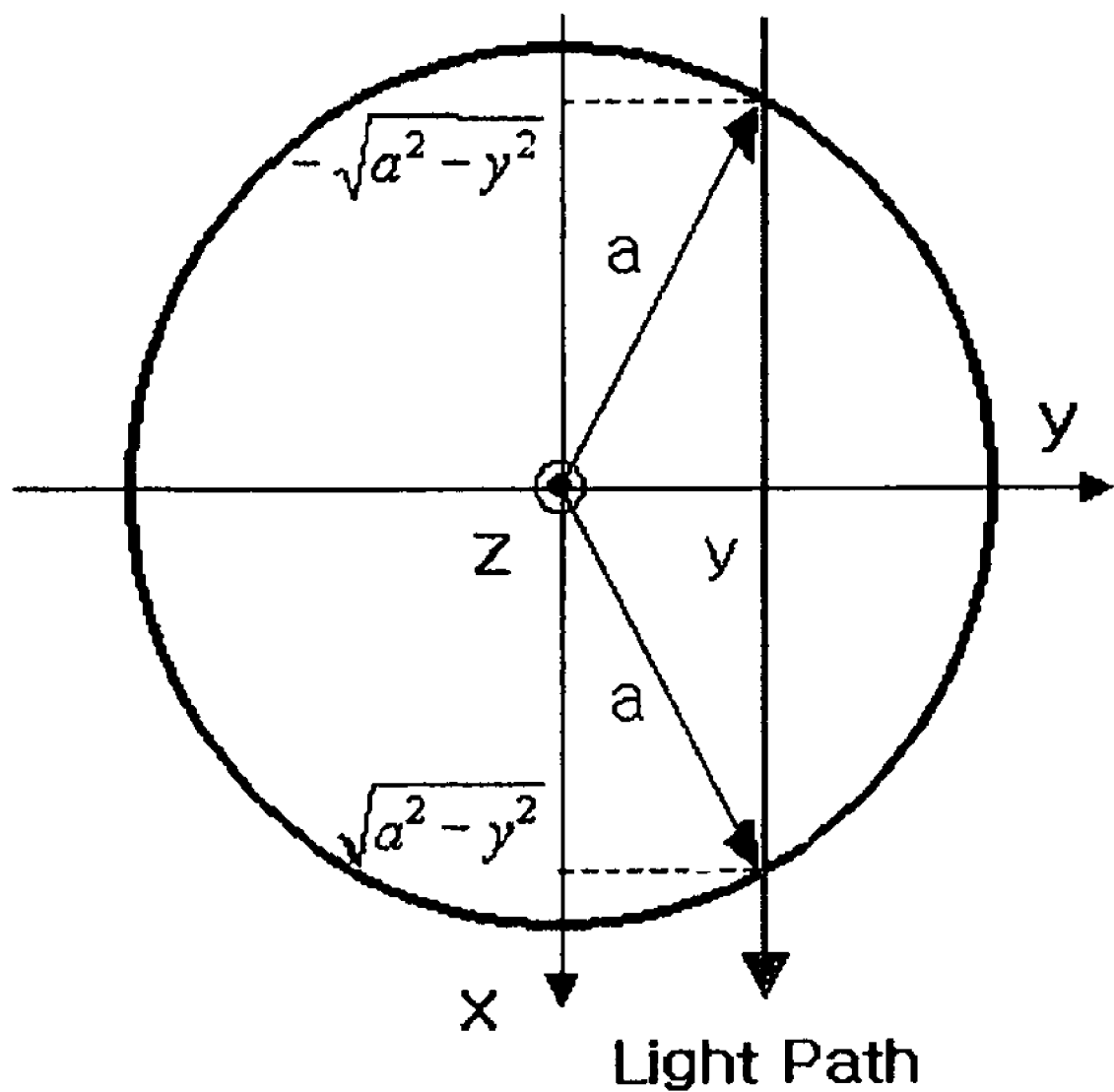

[FIG. 5]
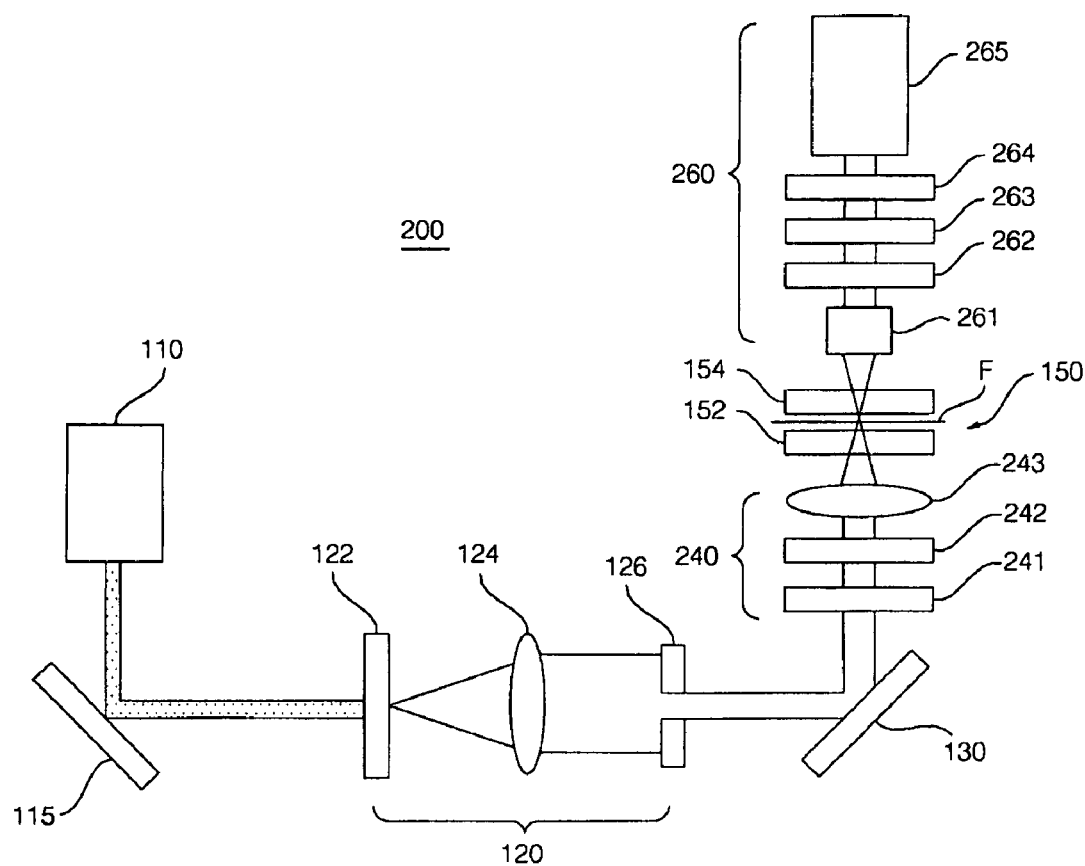

APPARATUS FOR MEASURING RESIDUAL STRESS OF OPTICAL FIBER

BACKGROUND OF THE INVENTION

1. Technical Field

The present invention relates to an apparatus for measuring residual stress of an optical fiber. More particularly, the present invention relates to an apparatus for measuring a residual stress of an optical fiber which is provided with a variable polarization device of which rotation is unnecessary to measure the residual stress in high resolution and at high speed instead of a rotary polarizer or analyzer.

2. Related Art

Optical communication is a communication system that transmits and receives light and signals through an optical fiber that is composed of a core having a high refractive index and a cladding having a low refractive index.

Corning Inc. developed an optical fiber having a transmission loss of 20 dB/km in 1970, which resulted in practically utilizing the optical communication. In the optical communication, a transmission terminal converts an electrical signal into a light signal and transmits the light signal through the optical fiber and a reception terminal reconverts the light signal into the electrical signal. The optical communication has an advantage in that there is no interference by external electromagnetic waves, wiretapping is difficult, and a large amount of information can be processed at the same time in comparison with electrical communication. The application area of the optical communication shows a tendency for growth.

The optical fiber is generally manufactured by a high-temperature drawing process. At this time, stress is generated. The stress is not completely removed and a part thereof resides after the optical fiber is manufactured. This is called residual stress. Accordingly, a technique to accurately measure the distribution and magnitude of the residual stress in the optical fiber and adjust the residual stress to an optimum state is required.

Meanwhile, a photoelastic effect is changed depending on the direction of stress which resides in a medium and a refractive index of the optical fiber or an optical fiber preform is changed depending on a polarization of light by the photoelastic effect.

The residual stress increases optical loss due to light scattering of the optical fiber and causes the refractive index to be changed by the photoelastic effect. The change of the refractive index of the optical fiber is a primary element for determining waveguide characteristics of an optical signal in the optical fiber. It is possible to accurately grasp optical characteristics of the optical fiber by the change of the refractive index. Accordingly, it is very important to measure the residual stress in order to produce high-quality optical fibers, develop special optical fibers, and research characteristics thereof.

FIG. 1 is a conceptual diagram of a known system for measuring residual stress of an optical fiber.

Light input from a light source passes through an optical fiber 30 through a rotary polarizer 10 and a wave plate 20. The light passing through the optical fiber 30 has a phase difference depending on distribution of stress in the optical fiber 30. The light passes through an analyzer 40, whereby the phase difference is displayed by optical intensity. The light passing through the analyzer 40 is input into a CCD camera to be converted to the electrical signal. The residual stress of the optical fiber is measured through such a process. Although not shown in the figure, the same principle is applied even to a system in which the analyzer rotates instead of the polarizer.

In the case of measuring the residual stress of the optical fiber as described above, a position where the intensity of the CCD camera is 0 is searched while rotating the polarizer or the analyzer using a motor and a rotational angle of the polarizer or the analyzer must be acquired when the intensity is 0. Therefore, it takes a long time to measure the residual stress of the optical fiber.

SUMMARY OF THE INVENTION

The present invention is contrived to solve the above-mentioned problems. An object of the present invention is to provide an apparatus for measuring a residual stress in an optical fiber, which can measure a residual stress in high resolution and at high speed.

In order to achieve the above-mentioned object, an apparatus for measuring a residual stress of an optical fiber according to an embodiment of the present invention includes a light generation unit that generates light; a lens unit that converts the generated light into collimated light; a polarization unit including variable polarization devices that divide the collimated light into two perpendicularly polarized light beams and control phase retardation of the polarized light beams by means of an electrical signal; a measurement unit that allows the divided light beams of two polarization states to penetrate an optical fiber to be measured; and a light detection unit that detects the polarization states of the light beams penetrating the optical fiber.

The variable polarization devices may include a fixed polarizer that divides the collimated light into two perpendicularly polarized light beams; a liquid crystal variable phase retarder that controls the phase retardation of the polarized light beams by means of the electrical signal; and a $\lambda/4$ wave plate into which the light penetrating the liquid crystal variable phase retarder is input.

The fixed polarizer may polarize the collimated light into a linearly polarized light beam at 45 degrees with respect to the axial direction of the optical fiber.

The light detection unit may include an objective lens that enlarges an image of the light penetrating the optical fiber; a fixed analyzer that prevents a background image of the optical fiber to be penetrated; and a charge coupled device (CCD) camera that converts the light penetrating the fixed analyzer into the electrical signal.

The polarization direction of the fixed analyzer may form an angle of 90 degrees with the polarization direction of the fixed polarizer.

The lens unit may include an optical diffuser that suppresses spatial coherence of the light emitted from the light generation unit; and a plano-convex lens that converts the light penetrating the optical diffuser into the collimated light.

An apparatus for measuring a residual stress of an optical fiber according to another embodiment of the present invention includes a light generation unit that generates light; a lens unit that converts the generated light into collimated light; a polarization unit that divides the collimated light into two perpendicularly polarized light beams; a measurement unit that allows the divided light beams of two polarization states to penetrate an optical fiber to be measured; variable polarization devices that control phase retardation of the light beams penetrating the optical fiber by means of an electrical signal; and a light detection unit that detects the polarization states of the light beams penetrating the variable polarization devices as optical intensity.

The polarization unit may include a fixed polarizer that divides the collimated light into two perpendicularly polarized light beams; and a λ/4 wave plate into which the light penetrating the fixed polarizer is input.

The fixed polarizer may polarize the collimated light into a linear polarized light beam at 45 degrees with respect to the axial direction of the optical fiber.

The variable polarization devices may include a fixed analyzer that prevents a background image of the optical fiber to be penetrated; a liquid crystal variable phase retarder that controls the phase retardation of the light penetrating the fixed analyzer by means of the electrical signal; and a λ/4 wave plate into which the light penetrating the liquid crystal variable phase retarder is input.

The lens unit may include an optical diffuser that suppresses spatial coherence of the light emitted from the light generation unit; and a plano-convex lens that converts the light penetrating the optical diffuser into the collimated light.

According to the present invention, a variable polarization device is controlled by means of an electrical signal without rotating a polarizer or an analyzer by using a motor in order to measure a residual stress of an optical fiber, whereby the residual stress of the optical fiber can be measured in high resolution by reducing a time taken to measure the residual stress of the optical fiber and the residual stress of the optical fiber can be easily measured through controlling of the electrical signal.

BRIEF DESCRIPTION OF THE DRAWINGS

FIG. 1 is a conceptual diagram of a known system for measuring residual stress of an optical fiber;

FIG. 2 is a configuration diagram of an apparatus for measuring a residual stress according to an embodiment of the present invention;

FIG. 3 is a conceptual diagram for illustrating a principle of a variable polarization device;

FIG. 4 is a conceptual diagram illustrating phase shift depending on a light propagation path; and FIG. 5 is a configuration diagram of an apparatus for measuring a residual stress according to another embodiment of the present invention.

DESCRIPTION OF THE PREFERRED EMBODIMENTS

Hereinafter, preferred embodiments of the present invention will be described in detail with reference to the accompanying drawings. First of all, we should note that in giving reference numerals to elements of each drawing, like reference numerals refer to like elements even though like elements are shown in different drawings. Further, in describing the present invention, well-known functions or constructions will not be described in detail since they may unnecessarily obscure the understanding of the present invention. Hereinafter, the preferred embodiment of the present invention will be described, but it will be understood to those skilled in the art that the spirit and scope of the present invention are not limited thereto and various modifications and changes can be made.

First, an apparatus for measuring a residual stress of an optical fiber according to an embodiment of the present invention will be described.

FIG. 2 is a configuration diagram of an apparatus for measuring a residual stress according to an embodiment of the present invention.

The apparatus 100 for measuring a residual stress of an optical fiber according to an embodiment of the present invention includes a light generation unit 110, a lens unit 120, a polarization unit 140, a measurement unit 150, and a light detection unit 160 with reference to FIG. 2. A first light adjusting unit 115 and a second light adjusting unit 130 are provided between the light generation unit 110 and the lens unit 120 and between the lens unit 120 and the polarization unit 140, respectively.

The light generation unit 110 is a light source that generates light for use in measuring the residual stress of the optical fiber. It is preferable that a laser is used as the light source of the light generation unit 110 and it is more preferable that a He—Ne laser or an Ar-ion laser is used as the light source of the light generation unit 110. Since the He—Ne laser or the Ar-ion laser has a very narrow spectrum, the He—Ne laser may be substantially regarded as a light source having a short wavelength. Therefore, when such light having a short-wavelength property penetrates the optical fiber F, the light of the He—Ne laser or the Ar-ion laser may show a unique phase shift value. However, the type of the light is not limited herein.

The first light adjusting unit 115 serves to shift the path of the light generated from the light generation unit 110. The first light adjusting unit 115 may be a reflector. The light generated from the light generation unit 110 is reflected on the first light adjusting unit 115, whereby the path of the light is shifted and is input into the lens unit 120.

The lens unit 120 serves to convert the light generated from the light generation unit 110 into collimated light. The lens unit 120 includes an optical diffuser 122, a plano-convex lens 124, and an iris 126.

The optical diffuser 122 completely diffuses the light reflected on the first light adjusting unit 115 to emit the light. At this time, the optical diffuser 122 serves to remove various types of diffraction patterns by spatial coherence of the laser, which is displayed in an image. The optical diffuser 122 may be rotated at high speed in order to acquire a timely uniform image.

The plano-convex lens 124 converts the light penetrating the optical diffuser 122 into the collimated light.

The iris 126 adjusts the quantity of the light penetrating the plano-convex lens 124 to allow light of a proper quantity to be input into the polarization unit 140.

The second light adjusting unit 130 serves to shift the path of the light penetrating the lens unit 120. The reflector may be used as the second light adjusting unit 130 similarly as the first light adjusting unit 115. The light penetrating the lens unit 120 is reflected on the second light adjusting unit 130, whereby the path of the light is shifted and is input into the polarization unit 140.

The polarization unit 140 divides the collimated light penetrating the lens unit 120 into two perpendicularly polarized light beams and controls phase retardation of the polarized light beams by means of an electrical signal to allow the polarized light having various phase retardation values to be input into the measurement unit 150. The polarization unit 140 includes variable polarization devices 141, 142, and 143, a λ/4 wave plate 144, and a convergent lens 145.

FIG. 3 is a conceptual diagram of the variable polarization device.

The variable polarization devices 141, 142, and 143 include a fixed polarizer 141, a liquid crystal variable phase retarder 142, and a λ/4 wave plate 143.

The fixed polarizer 141 serves to divide the collimated light penetrating the lens unit 120 into two perpendicularly polarized light beams. The fixed polarizer 141 allows an axial direction (a horizontal dotted line shown in FIG. 3) of the optical fiber F to form an angle of 45 degrees with a transmissive axis (T.A.) to polarize the collimated light into a linear polarized beam at 45 degrees to the axial direction of the optical fiber F. Accordingly, the fixed polarizer 141 allows two light sources having the same light intensity, which are polarized in the axial direction and a cross-sectional direction of the optical fiber F to be input into the optical fiber F at once. At this time, it is preferable that a spot size of the light penetrating the fixed polarizer 141 is small in order to reduce a polarization error caused due to non-uniformity of the fixed polarizer 141.

The liquid crystal variable phase retarder 142 controls phase retardation of the polarized light penetrating the fixed polarizer 141 by means of the electrical signal. At this time, the liquid crystal variable phase retarder 142 may be controlled by means of the electrical signal of approximately several kHz.

For example, the liquid crystal variable phase retarder 142 may have a structure in which liquid crystals are inserted between a pair of flat glass sheets coated with transparent electrodes on inner surfaces facing each other. When the liquid crystal variable phase retarder 142 is not applied with a voltage through the transparent electrodes, the liquid crystals are arranged in a line on the glass sheets and the phase retardation of the input light has the maximum value. As the voltage applied through the transparent electrodes increases, an angle between the direction of an electric field and the longitudinal direction of the liquid crystals decreases while the longitudinal direction of the liquid crystals forms an inclined angle with the glass sheets. As a result, the phase retardation of the input light decreases. When a voltage having a threshold value or more is applied through the transparent electrodes, the direction of the electric field is parallel to the longitudinal direction of the liquid crystals. At this time, the phase retardation of the input light decreases to the minimum. As described above, the liquid crystal variable phase retarder 142 may simply control the phase retardation of the polarized light penetrating the fixed polarizer 141 by controlling the electrical signal or the voltage.

Light penetrating the liquid crystal variable phase retarder 142 is input into the λ/4 wave plate 143, such that a phase difference between a slow axis (S.A.) and a fast axis (F.A.) becomes λ/4.

A process in which a linear polarization state of the input light is changed while the input light penetrates the variable polarization devices 142, 142, and 143 is expressed by a mathematical equation in the following equation.

$$\underbrace{\begin{bmatrix} \cos(\pi/2) & -\sin(\pi/2) \\ \sin(\pi/2) & \cos(\pi/2) \end{bmatrix} \begin{bmatrix} \exp(i\pi/4) & 0 \\ 0 & \exp(-i\pi/4) \end{bmatrix} \begin{bmatrix} \cos(\pi/2) & \sin(\pi/2) \\ -\sin(\pi/2) & \cos(\pi/2) \end{bmatrix}}_{\lambda/4 \text{ Wave plate}} \times$$

$$\underbrace{\begin{bmatrix} \cos(\pi/4) & -\sin(\pi/4) \\ \sin(\pi/4) & \cos(\pi/4) \end{bmatrix} \begin{bmatrix} \exp(i\delta/2) & 0 \\ 0 & \exp(-i\delta/2) \end{bmatrix} \begin{bmatrix} \cos(\pi/4) & \sin(\pi/4) \\ -\sin(\pi/4) & \cos(\pi/4) \end{bmatrix}}_{\text{Liquid crystal variable phase retarder}}$$

$$\underbrace{\begin{bmatrix} 1 \\ 0 \end{bmatrix}}_{\text{Fixed polarizer}} \underbrace{A\exp(i\varpi t)}_{\text{Input light}}$$

(Equation 1)

At this time, A is an amplitude of the input light, w is a frequency of the input light, and δ is a phase retardation value by the optical fiber.

It can be found that the linear polarization state of the light rotates by the phase retardation δ by the optical fiber through Equation 1.

As described above, the variable polarization devices 141, 142, and 143 substitutes for a known rotary polarizer 10 (referring to FIG. 1) that rotates the polarizer to control the phase retardation without rotating the polarizer, thereby rotating the linear polarization state by the controlling the phase retardation.

The convergent lens 145 converges the light beams that penetrate the variable polarization devices 141, 142, and 143 and the λ/4 wave plate 144 on the optical fiber F of the measurement unit 150.

The measurement unit 150 allows two polarization-state light beams divided through the polarization unit 140 to penetrate the optical fiber F so as to generate a phase variation difference between the axial direction and the cross-sectional direction of the optical fiber F. The measurement unit 150 is provided with a slide glass 152 and a cover glass 154 and the optical fiber F of which the residual stress will be measured is positioned therebetween.

The light detection unit 160 detects the polarization state of the light penetrating the optical fiber F as the light intensity. The light detection unit 160 includes an objective lens 162, a fixed analyzer 164, and a CCD camera 166.

The objective lens 162 enlarges an image of the light penetrating the optical fiber F, such that the image is caught in the CCD camera 166.

The fixed analyzer 164 is positioned between the objective lens 162 and the CCD camera 166. The fixed analyzer 164 disables a background image which is a light beam that does not penetrate the optical fiber F among the light beams penetrating the measurement unit 150 to be penetrated. Therefore, the fixed analyzer 164 is installed to form an angle of 90 degrees with the polarization direction of the fixed polarizer 141.

The polarization direction of the fixed analyzer 164 is arranged as described above, such that image distortion caused due to diffusion of ambient light can be prevented and an accurate focus can be acquired.

The CCD camera 166 converts the light penetrating the fixed analyzer 164 into the electrical signal. Therefore, the CCD camera 166 can detect the polarization state of the light penetrating the optical fiber F as the light intensity.

The intensity acquired by the CCD camera 166 has a relationship of the sine square with respect to the phase retardation value δ by the optical fiber F as shown in Equation 2.

$$I = I_0 \sin^2(\delta/2) \qquad \text{(Equation 2)}$$

Herein, $I_0$ is background intensity.

The residual stress of the optical fiber is measured with respect to each of the phase retardation values acquired through the apparatus for measuring the residual stress of the optical fiber according to an embodiment of the present invention by using the following equation.

$$\sigma_z(r) = \frac{-\lambda}{2\pi^2 C} \int_r^a \frac{d\delta/dy}{\sqrt{y^2 - r^2}} dy \qquad \text{(Equation 3)}$$

Herein, C is a residual stress coefficient, λ is a wavelength, a is a radius of the optical fiber, y is a distance of light penetrating the optical fiber from the center of the optical fiber, and r is a radial coordinate of the optical fiber. Such a relationship is shown in FIG. 4.

Next, an apparatus for measuring a residual stress of an optical fiber according to another embodiment of the present invention will be described.

FIG. 5 is a configuration diagram of an apparatus for measuring a residual stress according to another embodiment of the present invention. Except that variable polarization devices 262, 263, and 264 are positioned in a light detection unit 260 to substitute for the known rotary analyzer, the embodiment of FIG. 5 is similar as the embodiment of FIG. 2. Therefore, the difference will be primarily described.

The apparatus 200 for measuring a residual stress of an optical fiber according to another embodiment of the present invention includes a light generation unit 110, a lens unit 120, a polarization unit 240, a measurement unit 150, and a light detection unit 260 with reference to FIG. 5.

The polarization unit 240 includes a fixed polarizer 241, a λ/4 wave plate 242, and a convergent lens 243. The fixed polarizer 241 polarizes the collimated light penetrating the lens unit 120 into a linearly polarized beam at 45 degrees with respect to the axial direction of the optical fiber F to serve to divide the collimated light into two perpendicularly polarized beams (the axial direction and a cross-sectional direction of the optical fiber F).

The light detection unit 260 includes an objective lens 261, the variable polarization devices 262, 263, and 264, and a CCD camera 265.

The variable polarization devices 262, 263, and 264 include a fixed analyzer 262, a liquid crystal variable phase retarder 263, and a λ/4 wave plate 264. The fixed analyzer 262 is disposed to form an angle of 90 degrees with the polarization direction of the fixed polarizer 241 to disable the background image among the light beams penetrating the measurement unit 150 to be penetrated. The liquid crystal variable phase retarder 263 controls the phase retardation of the polarized light penetrating the fixed analyzer 262 by means of the electrical signal.

The variable polarization devices 262, 263, and 264 substitute for the known rotary analyzer that rotates the polarizer to control the phase retardation of the polarized light without rotating the polarizer, thereby rotating the linear polarization state by the controlling the phase retardation.

While certain embodiments have been described above, it will be understood that the embodiments described are by way of example only. It will be apparent to those skilled in the art that various modification, changes, and alternations may be made without departing from the spirit and scope of the present invention. Accordingly, the embodiments disclosed in the present invention and the accompanying drawings do not limit but describes the spirit of the present invention and the scope of the spirit of the present invention is not limited by the embodiments and the accompanying drawings. It will be appreciated that the protection scope of the present invention should be defined by the appended claims and all the spirits within the equivalents should be included in the appended claims.

The present invention provides an apparatus for measuring a residual stress of an optical fiber in high resolution and at high speed, which can measure the residual stress of the optical fiber, which has a large influence on optical loss and optical waveguide characteristics in the optical fiber, at high speed. Therefore, the present invention may be widely used for grasping optical characteristics of the optical fiber, producing high-quality optical fibers, developing specific optical fibers, and researching the characteristics of the optical fibers.

What is claimed is:

1. An apparatus for measuring a residual stress of an optical fiber, comprising:
   a light generation unit that generates light;
   a lens unit including a rotating optical diffuser configured to suppress spatial coherence of the light emitted from the light generation unit, a plano-convex lens configured to convert light penetrating the optical diffuser into collimated light, and an iris configured to adjust a quantity of the light penetrating the plano-convex lens;
   a polarization unit including a fixed polarizer configured to divide the collimated light into two perpendicularly polarized light beams;
   a liquid crystal variable phase retarder configured to control the phase retardation of the polarized light beams by means of the electrical signal;
   a λ/4 wave plate into which the light penetrating the liquid crystal variable phase retarder is input;
   a measurement unit configured to allow the divided light beams of two polarization states to penetrate an optical fiber to be measured; and
   a light detection unit configured to detect the polarization states of the light beams penetrating the optical fiber.

2. The apparatus for measuring a residual stress of an optical fiber according to claim 1, wherein the fixed polarizer is configured to polarize the collimated light into a linearly polarized light beam at 45 degrees with respect to the axial direction of the optical fiber.

3. The apparatus for measuring a residual stress of an optical fiber according to claim 1, wherein the light detection unit includes:
   an objective lens configured to enlarge an image of the light penetrating the optical fiber;
   a fixed analyzer configured to prevent a background image of the optical fiber to be penetrated; and
   a charge coupled device (CCD) camera configured to convert the light penetrating the fixed analyzer into the electrical signal.

4. The apparatus for measuring a residual stress of an optical fiber according to claim 3, wherein the polarization direction of the fixed analyzer is configured to form an angle of 90 degrees with the polarization direction of the fixed polarizer.

* * * * *